(12) United States Patent
Loza

(10) Patent No.: US 11,331,986 B1
(45) Date of Patent: May 17, 2022

(54) ENERGY ABSORPTION STRUCTURE

(71) Applicant: Ford Global Technologies, LLC, Dearborn, MI (US)

(72) Inventor: Israel Hiram Loza, Azcapotzalco (MX)

(73) Assignee: Ford Global Technologies, LLC, Dearborn, MI (US)

( * ) Notice: Subject to any disclaimer, the term of this patent is extended or adjusted under 35 U.S.C. 154(b) by 53 days.

(21) Appl. No.: 17/099,906

(22) Filed: Nov. 17, 2020

(51) Int. Cl.
*B60J 5/04* (2006.01)
*B60R 19/18* (2006.01)

(52) U.S. Cl.
CPC .......... *B60J 5/0441* (2013.01); *B60J 5/0413* (2013.01); *B60J 5/0434* (2013.01); *B60R 2019/1893* (2013.01)

(58) Field of Classification Search
CPC ...... B60J 5/0413; B60J 5/0441; B60J 5/0434; B60R 2019/1893
USPC ....... 296/187.12, 146.5, 146.6; 293/132, 133
See application file for complete search history.

(56) References Cited

U.S. PATENT DOCUMENTS

| 3,506,295 | A | | 4/1970 | Yancey | |
|---|---|---|---|---|---|
| 3,989,275 | A | * | 11/1976 | Finch | B60R 21/0428 296/146.7 |
| 5,433,478 | A | * | 7/1995 | Naruse | B60R 21/0428 296/146.7 |
| 5,435,619 | A | | 7/1995 | Nakae et al. | |
| 6,145,908 | A | * | 11/2000 | Deb | B60R 13/0206 296/187.05 |
| 7,775,584 | B2 | * | 8/2010 | Hughes, Jr | B60N 2/4235 296/187.05 |
| 8,915,536 | B2 | * | 12/2014 | Tamada | B32B 3/266 296/187.05 |

FOREIGN PATENT DOCUMENTS

DE 29505064 7/1996

* cited by examiner

Primary Examiner — Joseph D. Pape
(74) Attorney, Agent, or Firm — Vichit Chea; Price Heneveld LLP

(57) ABSTRACT

A vehicle door includes an interior panel including a housing extending from a first side of the interior panel and defining a cavity. An energy absorption structure is positioned within the cavity and includes a plurality of members arranged in a plurality of rows. Each of the plurality of members includes at least one arcuate support coupled with a rib and having first and second ends. The at least one arcuate support of each member is coupled to the at least one arcuate support of a neighboring member at one of the first and second ends.

20 Claims, 7 Drawing Sheets

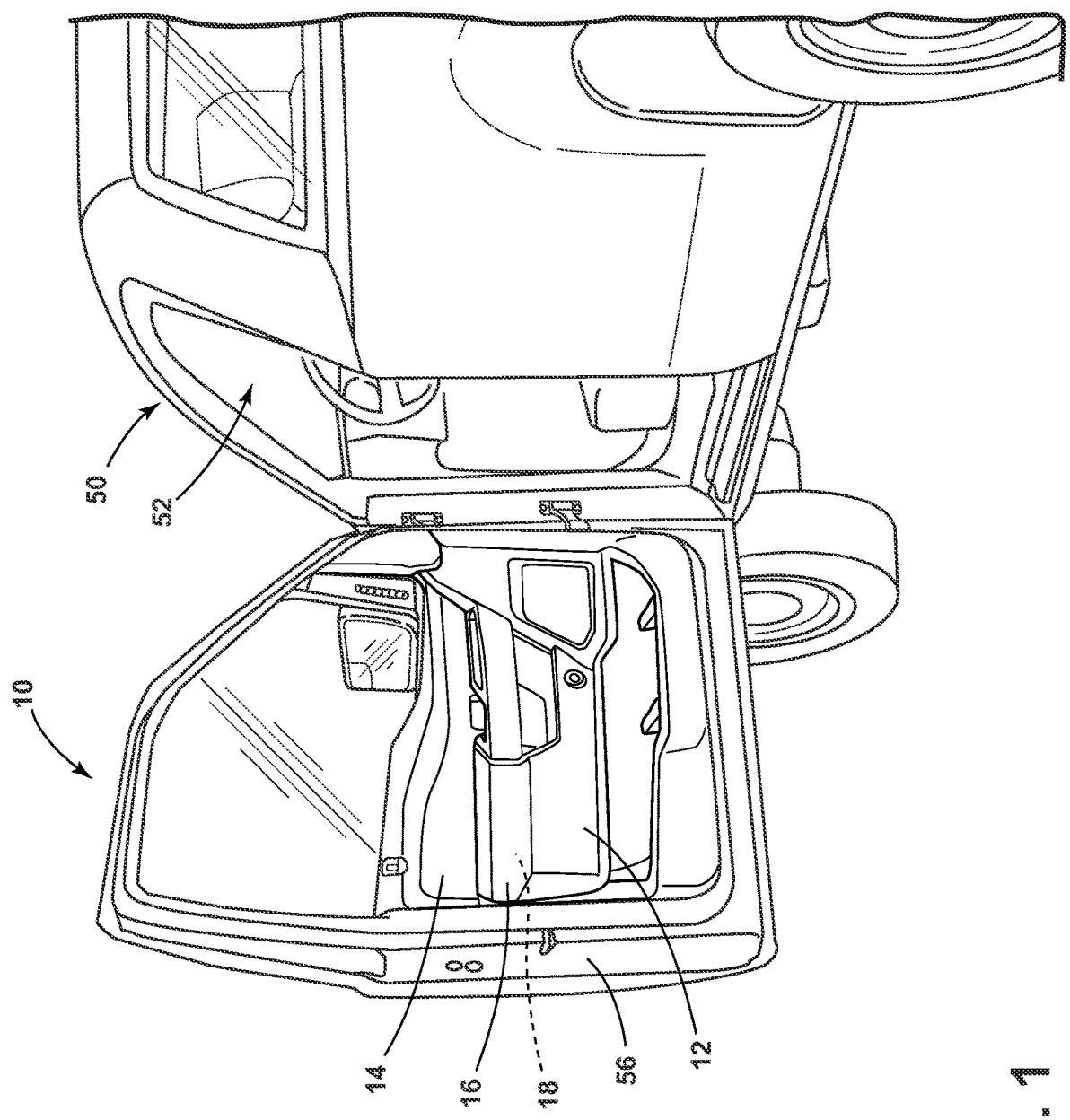

ENERGY ABSORPTION STRUCTURE

FIELD OF THE DISCLOSURE

The present disclosure generally relates to an energy absorption structure, and more specifically to an energy absorption structure for use in a vehicle door.

BACKGROUND OF THE DISCLOSURE

Vehicle doors may include various features extending into an interior of a vehicle. These features may be configured to absorb energy from various forces while also maintaining various structural properties.

SUMMARY OF THE DISCLOSURE

According to one aspect of the present disclosure, a vehicle door includes an interior panel including a housing extending from a first side of the interior panel and defining a cavity. An energy absorption structure is positioned within the cavity and includes a plurality of members arranged in a plurality of rows. Each of the plurality of members includes at least one arcuate support coupled with a rib and having first and second ends. The at least one arcuate support of each member is coupled to the at least one arcuate support of a neighboring member at one of the first and second ends.

Embodiments of this aspect of the disclosure, or any other aspect of the disclosure described herein, can include any one or a combination of the following features:
- at least one arcuate support comprising one or more upper supports and one or more lower supports, the upper and lower supports spaced apart by a central space;
- each support of at least one arcuate support including a plurality of linear segments extending between first and second ends;
- a housing configured to form an armrest;
- an exterior panel coupled with an interior panel and configured to at least partially cover a second side of the interior panel and an energy absorption structure positioned between the interior panel and the exterior panel; and/or
- at least one support having a semi-circular shape and opening toward a first side of an interior panel.

According to another aspect of the present disclosure, a vehicle door includes a panel having a first side and a second side. A housing extends from the first side and defines a cavity in communication with an opening. The opening is defined by a rim of the second side. An energy absorption structure is positioned within the cavity. The energy absorption structure includes a first member having a first central rib and a first support having a first end and a second member having a second central rib and a second support having a second end. The second end contacts the first end at a joinder. A third member is offset from the first and second members and includes a third central rib. The joinder is coupled with an edge of the third central rib.

Embodiments of this aspect of the disclosure, or any other aspect of the disclosure described herein, can include any one or a combination of the following features:
- each member including one or more upper supports and one or more lower supports, the upper and lower supports spaced apart by a central space;
- each support including a plurality of linear segments to form a substantially semi-circular shape centered on a central rib;
- a housing configured to form an armrest; and/or
- a cover coupled with a rim of a second side of a panel to enclose an energy absorption structure within a cavity of a housing.

According to another aspect of the present disclosure, an energy absorption structure for a vehicle includes a first member including at least one first support extending from a first central rib and having a substantially semi-circular shape and a second member including at least one second support extending from a second central rib and having a substantially semi-circular shape. The first and second members are positioned in a first row. A third member includes at least one third support extending from a third central rib and having a substantially semi-circular shape. The third member is positioned in a second row offset from the first row, a first end of the at least one first support and a second end of the at least one second support are coupled with the third central rib.

Embodiments of this aspect of the disclosure, or any other aspect of the disclosure described herein, can include any one or a combination of the following features:
- at least one first support including a first upper support and a first lower support spaced apart by a first central space and at least one second support including a second upper support and a second lower support spaced apart by a second central space;
- a first upper support coupled with a second upper support and a first lower support is coupled with a second lower support;
- at least one first support including a pair of first upper supports spaced apart by a first upper space and a pair of first lower supports spaced apart by a first lower space;
- a pair of first upper supports spaced apart from a pair of first lower supports by a first central space;
- each of at least one first support, at least one second support, and at least one third support including a plurality of linear segments extending from a central segment;
- a plurality of linear segments of each member integrally formed with a respective central rib as a single piece;
- first, second, and third members are integrally formed as a single piece; and/or
- one of at least one first support, at least one second support, and at least one third support including a foot extending outward from the respective support.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings:

FIG. 1 is a rear side perspective view of a vehicle with a door in an open position and including an interior panel, according to various examples;

DETAILED DESCRIPTION OF THE PREFERRED EMBODIMENTS

Figure 2B:
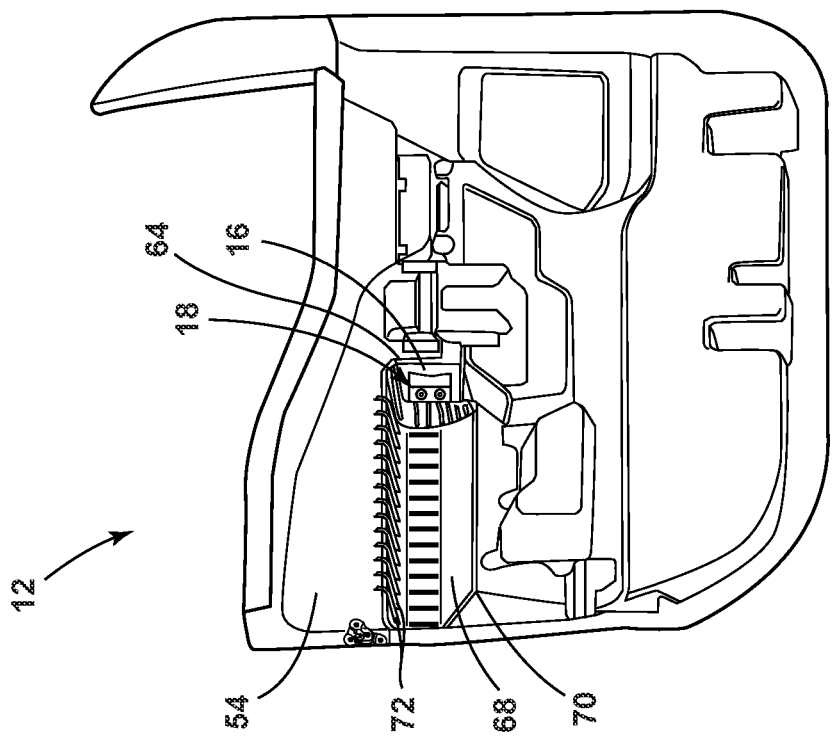
FIG. 2B is a rear perspective view of the interior panel of FIG. 2A including a cover positioned proximate a housing.

The present illustrated embodiments reside primarily in combinations of method steps and apparatus components related to an energy absorption structure. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring now to FIGS. 1-6A, reference numeral 10 generally indicates a vehicle door including an interior panel 12. The interior panel 12 includes a housing 16 extending from an interior side 14 of the interior panel 12 (e.g., an armrest). The housing 16 defines a cavity 18 configured to receive an energy absorption structure 20. The energy absorption structure 20 includes a plurality of members 24 arranged in a plurality of rows 26. Each of the plurality of members 24 includes a rib 30 extending between a plurality of supports 22. Each support 22 is substantially arcuate and extends between first and second ends 32, 34. Each support 22 is interconnected with a support 22 of a neighboring member 24 at one of the first and second ends 32, 34.

Referring now to FIG. 1, a vehicle 50 is illustrated including the door 10 in an open position. The door 10 may be one of a plurality of doors positioned on opposing sides of the vehicle 50. As illustrated, the door 10 is an exemplary forward driver's side door including a handle 58 and a storage bin 62; however, it will be understood that the energy absorption structure 20 may be used in any door 10 of the vehicle 50 and/or in various other portions of the vehicle 50 (e.g., interior panel assemblies) without departing from the scope of the present disclosure.

As introduced above, the door 10 includes the interior panel 12 having a first side 14, also referred to as the interior side 14, positioned to face the interior 52 of the vehicle 50 and a second, opposing side 54. The second side 54 is positioned to face an exterior panel 56 of the door 10 when the interior panel 12 is coupled with the exterior panel 56 to form the door 10. The second side 54 is configured to be spaced apart from and covered by the exterior panel 56 of the door 10 and is substantially enclosed between the interior panel 12 and the exterior panel 56 when the door 10 is assembled.

As illustrated in FIGS. 1-2B, the interior panel 12 may include at least one housing 16 configured as part of a trim of the door 10. For example, the housing 16 may define an armrest or any other feature extending into the vehicle interior 52 from the interior panel 12 of the door 10. The housing 16 may be integrally formed by the interior panel 12 and may define a cavity 18, as introduced above. The cavity 18 is configured to receive one or more energy absorption structures 20. While only one energy absorption structure 20 is illustrated received by the cavity 18 of the housing 16 and the housing 16 is configured to form an armrest, it will be understood that any number of energy absorption structures 20 may be used without departing from the scope of the present disclosure. It will also be understood that any number of housings 16 and/or cavities 18 may be formed by the interior panel 12 and that more than one energy absorption structures 20 may be received by each cavity 18.

Figure 2A:
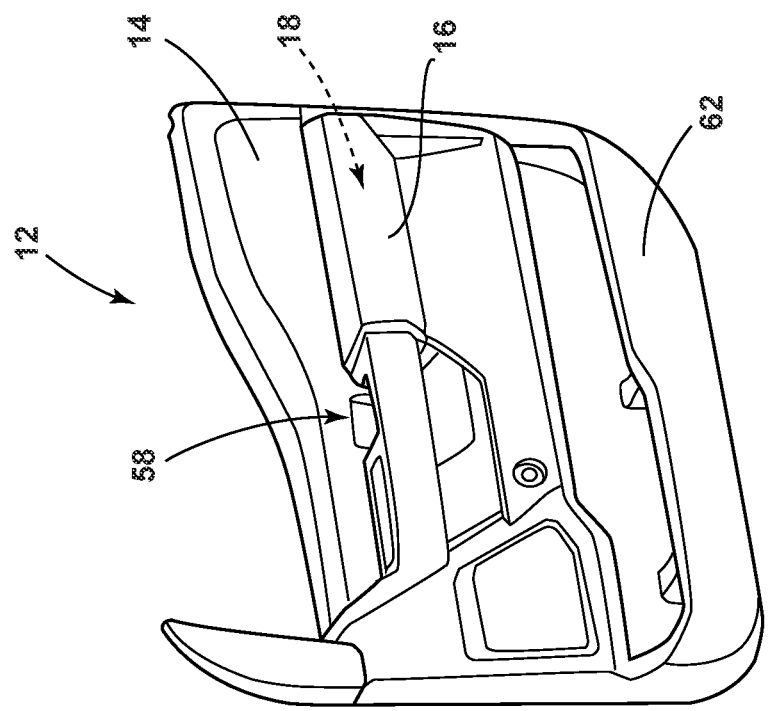
FIG. 2A is a front perspective view of an interior panel of a door, according to various examples.
Figure 3:
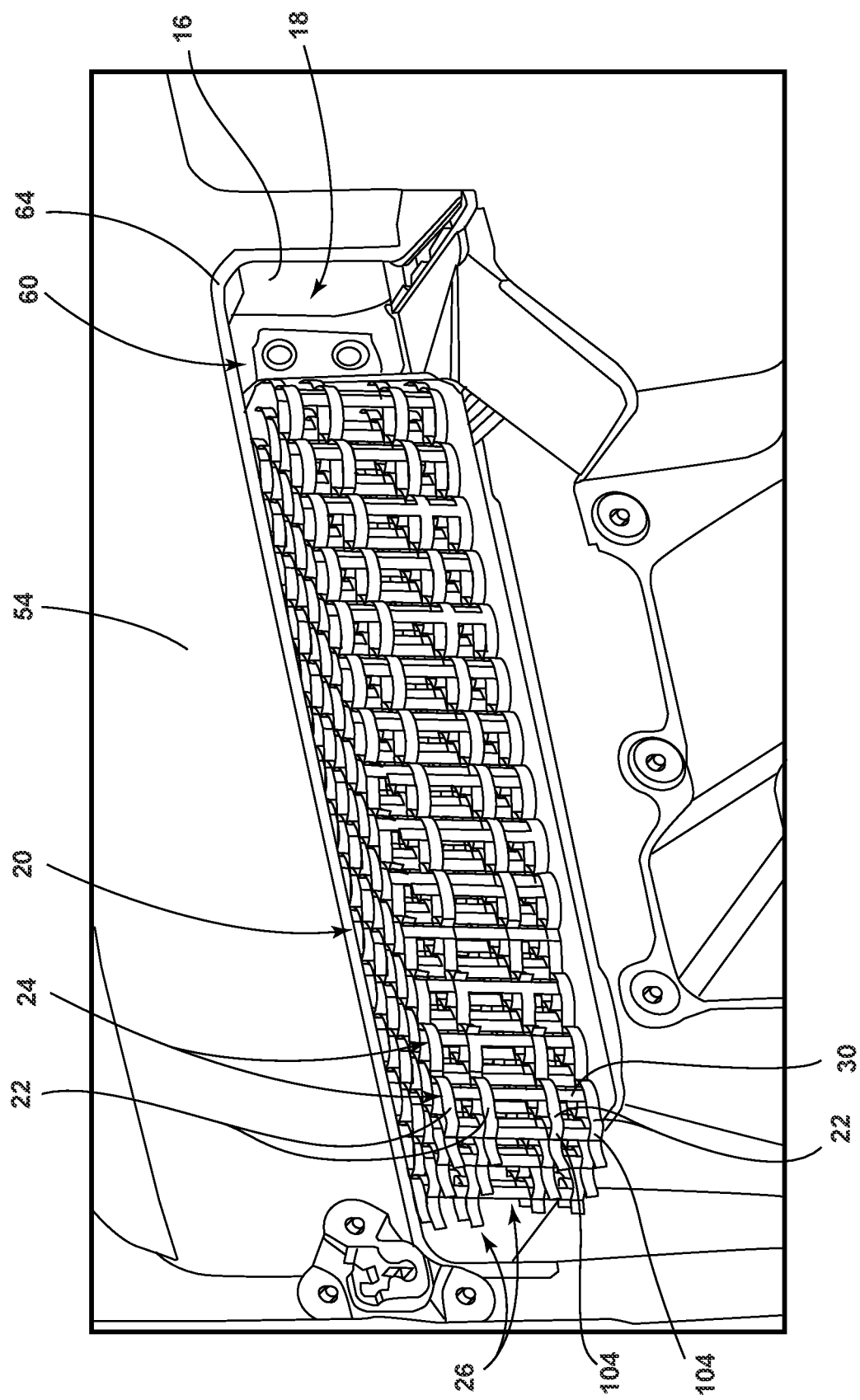
FIG. 3 is an enlarged rear perspective view of the housing of FIG. 2B with the cover removed and an energy absorption structure positioned within a cavity of the housing.

As shown in FIGS. 2A-3, the housing 16 may be shaped as a rectangular prism with an opening 60 defined by a rear rim 64 of the housing 16. The opening 60 may be defined in communication with the cavity 18. As best shown in FIG. 3, when the door 10 is assembled, the energy absorption structure 20 is positioned within the cavity 18 of the housing 16 and is coupled with the second side 54 of the interior panel 12. When the energy absorption structure 20 is positioned within the cavity 18, the energy absorption structure 20 may extend at least partially through the opening 60. In various examples, the energy absorption structure 20 may be integrally formed with a portion of the interior panel 12 (e.g., the housing 16 or the cover 68). In other examples, the energy absorption structure 20 may be fixedly or removably coupled with the interior panel 12.

Referring now to FIG. 2B, a cover 68 may be coupled with the second side 54 of the interior panel 12 to enclose the cavity 18 and the energy absorption structure 20. The cover 68 may be shaped to complement the rear rim 64 and the opening 60 defined thereby. An edge 70 of the cover 68 may be coupled with the rear rim 64 of the housing 16. The cover 68 may further include reinforcing elements 72 (e.g., ribs) configured to provide additional structure to the cover 68 and/or to couple the cover 68 with the second side 54 of the interior panel 12. However, it will be understood that the cover 68 may have any shape, form, or reinforcement without departing from the scope of the present disclosure.

Figure 4:
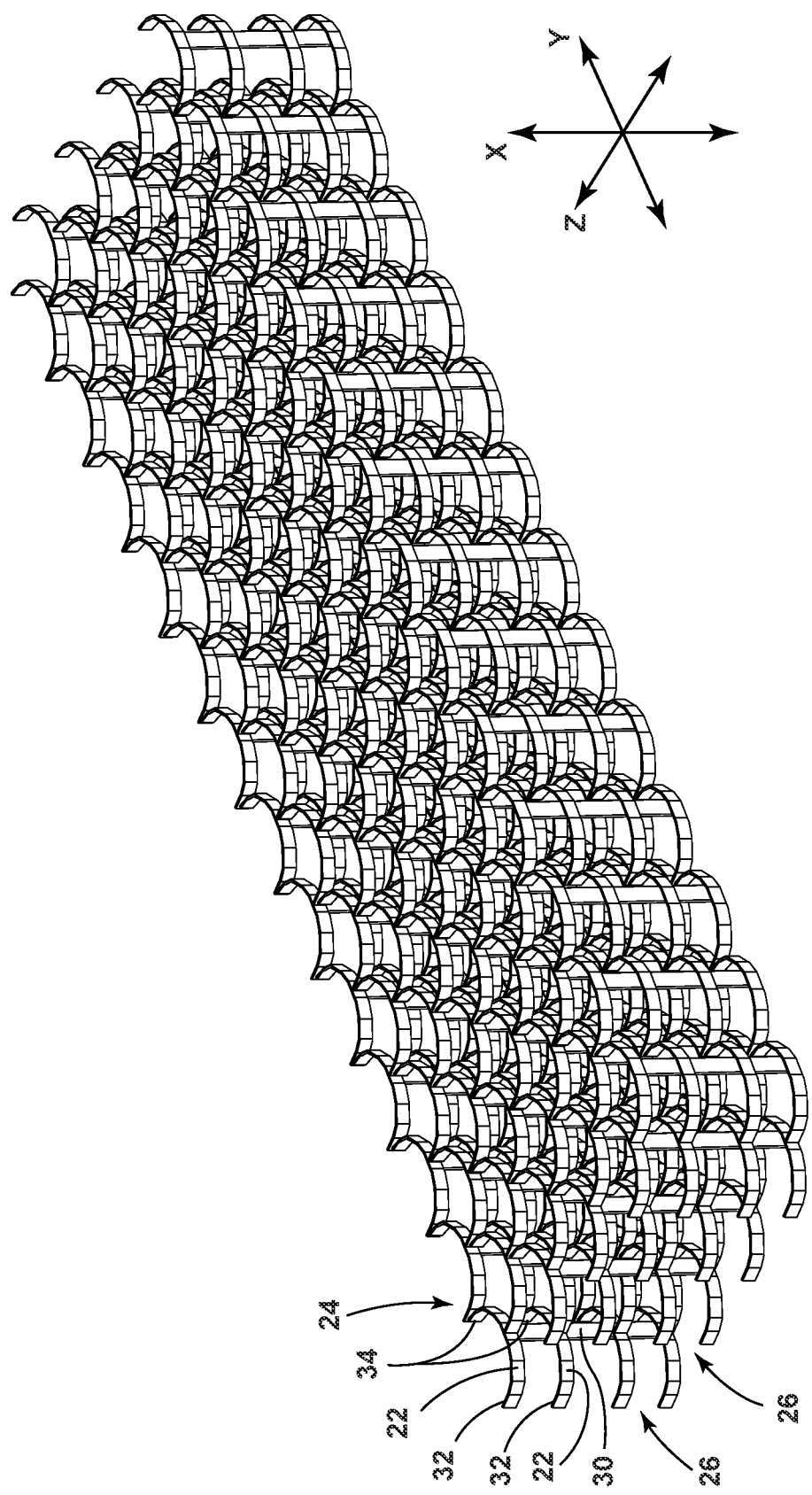
FIG. 4 is a side perspective view of an energy absorption structure, according to various examples.

With reference now to FIG. 4, the energy absorption structure 20 includes a plurality of members 24. Each of the plurality of members 24 includes the central rib 30 extending in a first direction X. The plurality of members 24 are arranged to in a plurality of rows 26. Each row 26 extends in a second direction Y. The plurality of rows 26 are stacked in a third direction Z and are oriented such that the plurality of members 24 of alternative rows 26 are offset. It will be appreciated that the number and arrangement of the plurality of members 24 are exemplary in nature and that any number of members 24 may be arranged in any number of rows 26 to form the energy absorption structure 20.

Figure 5:
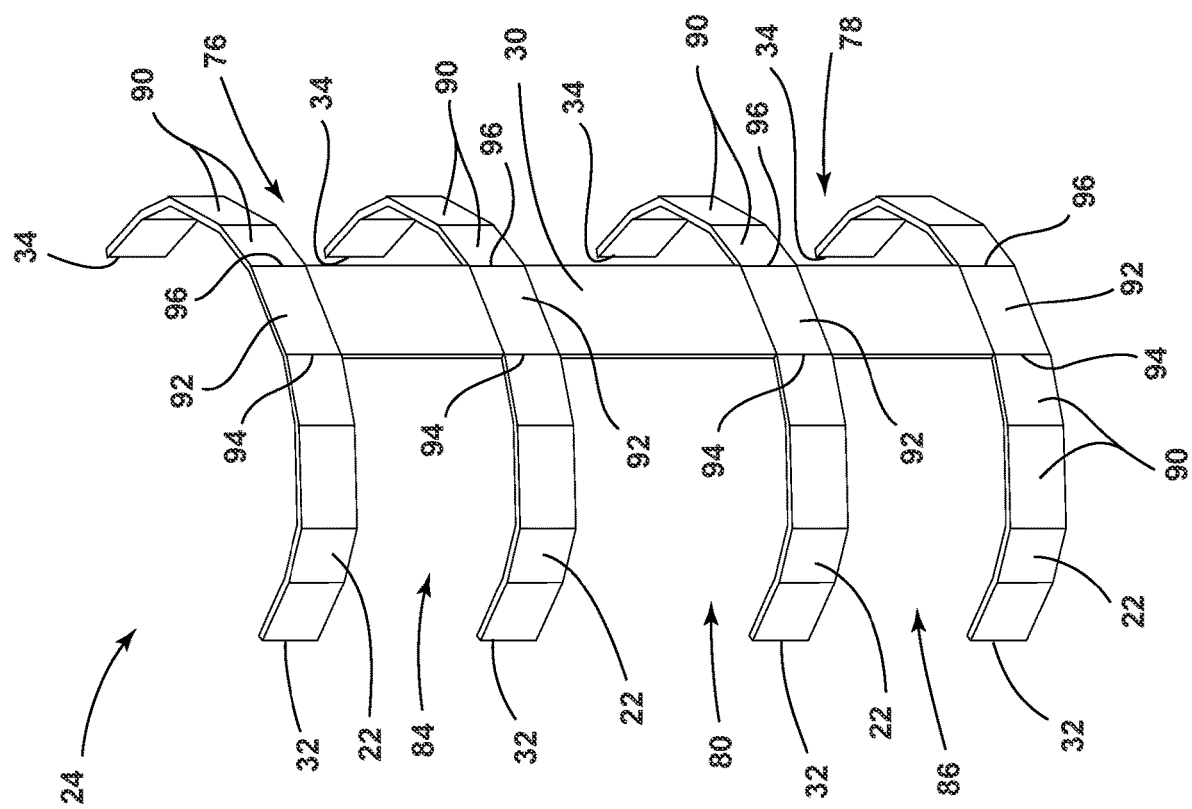
FIG. 5 is a side perspective view of a member of the energy absorption structure of FIG. 4.

Referring now to FIGS. 4 and 5, each of the plurality of members 24 includes one or more supports 22 interconnected by the central rib 30. As best shown in FIG. 5, the supports 22 are spaced apart along the central rib 30 to form the member 24. In various examples, the supports 22 may be equally spaced along the central rib 30. In other examples, the plurality of supports 22 may include one or more upper supports 76 spaced apart from one or more lower supports 78 by a central space 80. As illustrated, each member 24 includes a corresponding plurality of supports 22 spaced apart along the central rib 30. The plurality of supports 22 includes a pair of upper supports 76 spaced apart by a first space 84 and a pair of lower supports 78 spaced apart by a second space 86. The central space 80 may be larger than the first space 84 defined between the one or more upper supports 76 and/or the second space 86 defined between the one or more lower supports 78. The first space 84 between the one or more upper supports 76 may be the same size as the second space 86 between the one or more lower supports 78, or the first space 84 between the one or more upper supports 76 may be larger or smaller than the second space 86 between the one or more lower supports 78.

With continued reference to FIG. 5, the plurality of supports 22 may be integrally formed with a central rib 30 of the respective member 24 as a single piece or may be coupled with the central rib 30 of the respective member 24. Each of the plurality of supports 22 is formed of a plurality of linear segments 90 coupled together to create a substantially arcuate shape for each support 22. As illustrated, the linear segments 90 are angled relative to one another to form a substantially semi-circular shape of the support 22. Each of the plurality of linear segments 90 may be the same length, or the plurality of linear segments 90 may differ in length across the support 22.

The plurality of linear segments 90 of each of the plurality of supports 22 may be centered around a central segment 92 of the respective support 22 and may be distributed in a substantially symmetrical pattern about an axis A extending through central rib 30. The plurality of linear segments 90 are integrally formed to extend from the central segment 92 to one of the first and second ends 32, 34 of the support 22. As illustrated, the central segment 92 is integrally formed with the central rib 30. However, it is contemplated that the central segment 92 may be coupled with the central rib 30 without departing from the scope of the present disclosure.

As best shown in FIG. 5, each support 22 includes eight linear segments 90 arranged with four linear segments 90 aligned to extend from a first edge 94 of the central rib 30 and four linear segments 90 aligned to extend from a second edge 96 of the central rib 30. The central segment 92 is aligned with the central rib 30 such that the support 22 includes a total of nine linear segments 90, 92. However, it will be understood that the use of four linear segments 90 positioned on either side of the central rib 30 is exemplary only and any number of linear segments 90 may be used without departing from the scope of the presented disclosure.

Figure 6:
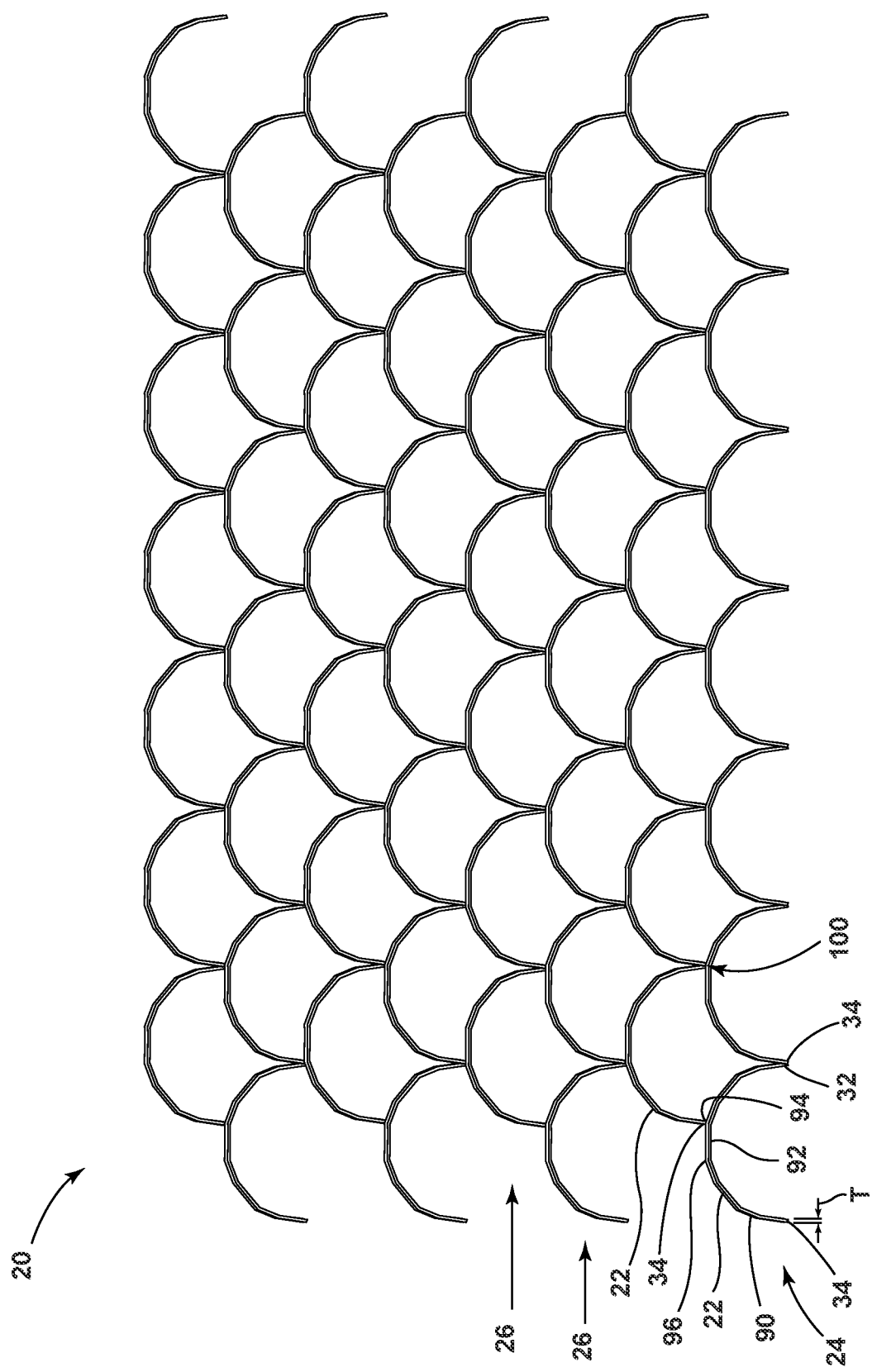
FIG. 6 is a top elevation view of the energy absorption structure of FIG. 4.

As best shown in FIGS. 4-6, each support 22 includes first and second ends 32, 34. When the plurality of members 24 are positioned in the plurality of rows 26, each of the plurality of members 24 is positioned with at least one neighboring member 24. The first end 32 of each support 22 may be coupled with the second end 34 of a corresponding, neighboring support 22, hereinafter referred to as of a joinder 100 of the supports 22. The plurality of members 24 may further include members 24 positioned on an edge of the structure 20 such that the first or second end 32, 34 of each of the plurality of supports 22 of the member 24 is not included in a joinder 100. The first end 32 or the second end 34 of these supports 22 may be free-floating (see FIG. 4). Alternatively, the first or second end 32, 34 of these supports 22 may include a foot 104 (see FIG. 3). The foot 104 may be configured to be extend outward from the end 32, 34 of the support 22 and/or may be configured to be coupled with the interior panel 12 of the door 10 (not shown).

Referring still to FIGS. 4-6, as previously introduced, the plurality of members 24 are arranged in the plurality of rows 26 extending in the second direction Y and stacked in the third direction Z (see FIG. 4). In the plurality of rows 26, the plurality of members 24 are positioned such that each support 22 of each member 24 is aligned with at least one corresponding support 22 of a neighboring member 24 to form a joinder 100. The plurality of rows 26 of the plurality of members 24 are stacked in the third direction and are staggered such that the members 24 in alternate rows 26 are offset. This orientation forms a lattice structure within the energy absorption structure 20. In various examples, each of the plurality of rows 26 may include the same number of members 24 to form the lattice structure of the energy absorption structure 20. In other examples, one or more of the plurality of rows 26 may include a different number of members 24. The number of members 24 in the rows 26 may allow the shape and size of the energy absorption structure 20 to be adjusted.

As best shown in FIG. 6, the edge 94, 96 of the central rib 30 that the joinders 100 of each of the plurality of rows 26 are coupled with may alternate throughout the pattern. However, it is contemplated that the joinders 100 may be consistently coupled with the same edge of the edges 94, 96 throughout the pattern of the energy absorption structure 20 or that the joinders 100 may be positioned between the edges 94, 96 without departing from the scope of the present disclosure.

Figure 6A:
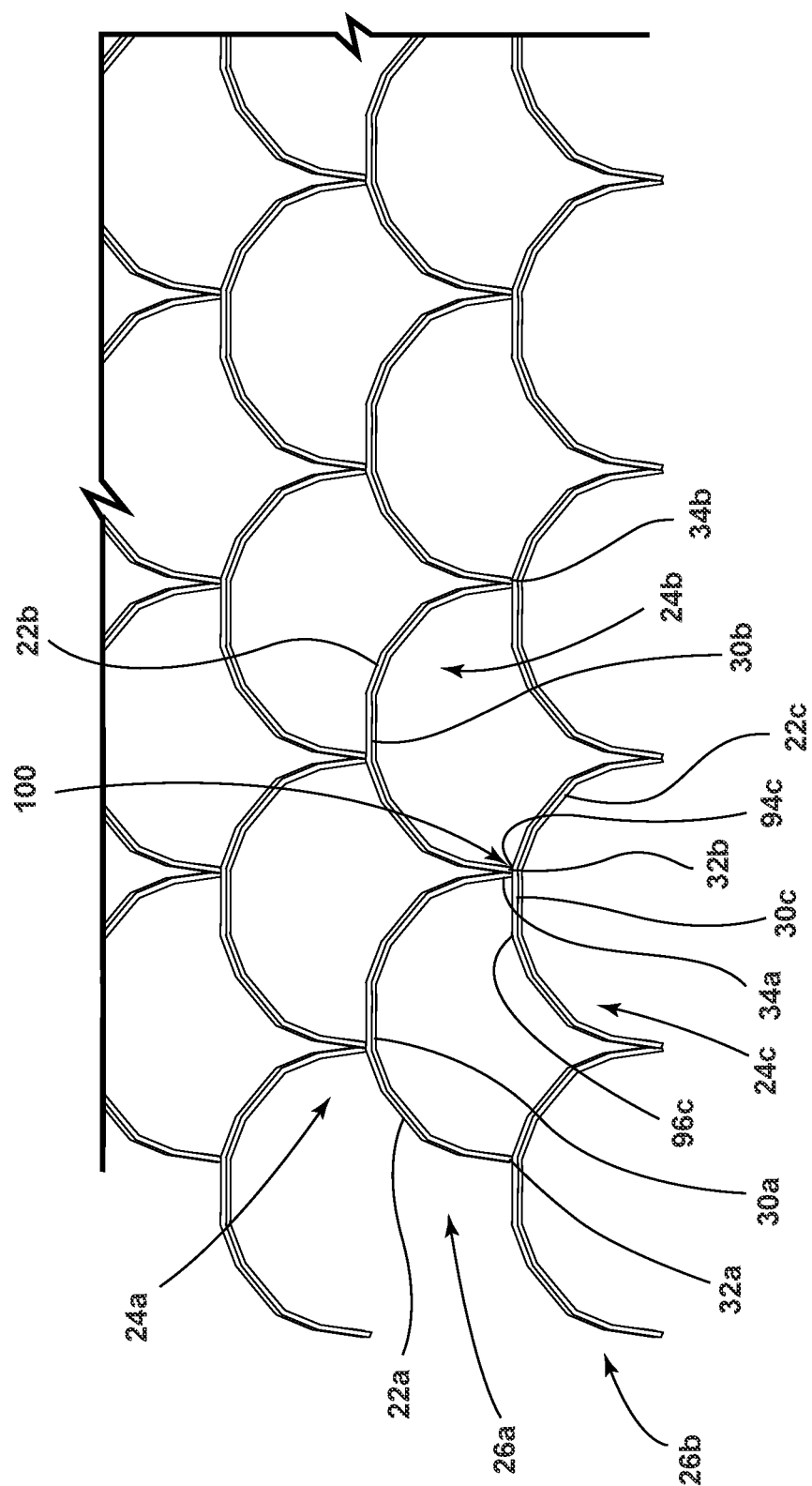
FIG. 6A is an enlarged view of an exemplary section of the energy absorption structure of FIG. 6.

For example, as illustrated in FIG. 6A, a first member 24a including at least one first support 22a is positioned proximate a second member 24b including at least one second support 22b to form a first row 26a of the plurality of rows 26. The first support 22a of the first member 24a includes opposing ends 32a, 34a and is integrally formed with a first central rib 30a, and the second support 22b of the second member 24b includes opposing ends 32b, 34b and is integrally formed with a second central rib 30b. The second end 34a of the first support 22a is integrally formed with the first end 32b of the second support 22b to form a joinder 100. A third member 24c is positioned in a second row 26b offset from the first row 26a and includes at least one third support 22c. A central rib 30c of the third member 24c is aligned with the joinder 100 of the first and second members 24a, 24b. The joinder 100 is coupled with one of the first and second edges 94c, 96c of the central rib 30c of the third member 24c. This pattern of coupling the plurality of supports 22 of the plurality of members 24 continues throughout the energy absorption structure 20 to form a three dimensional (3D) lattice structure.

Each of the plurality of supports 22 of the energy absorption structure 20 includes a predetermined thickness T determined by the position and use of the energy absorption structure 20. For example, the thickness T of each member may be about 0.25 mm, about 0.5 mm, about 0.75 mm, about 1.0 mm, or any thickness or range of thicknesses therebetween. In various examples, the thickness T may be consistent across the entirety of the structure 20. In other examples, the thickness T may alternate across the energy absorption structure 20 (e.g., the thickness may be tapered across the energy absorption structure 20 in one or more directions, may differ between the rows 26, may differ between the members 24, etc.).

As previously discussed with reference to FIGS. 1-6A, the plurality of members 24 and the respective supports 22 may be oriented within the energy absorption structure 20 to create a pattern of layered fractals to absorb energy while simultaneously providing energy absorption for an area of the door 10 (e.g., the armrest). When the energy absorption structure 20 is formed, the plurality of members 24 of each of the plurality of rows 26 may be integrally formed as a single, continuous piece using a three-dimensional (3D) printing process (additive manufacturing) to form a single continuous structure having predetermined dimensions. For example, the structure 20 may be formed using any practicable additive manufacturing process, for example, but not limited to, extrusion additive manufacturing (e.g., fused filament fabrication), photopolymerization additive manufacturing (e.g., stereolithography or SLA), powder bed fusion additive manufacturing, material jetting additive manufacturing, binder jetting additive manufacturing, directed energy deposition additive manufacturing, lamination, additive manufacturing, and/or any combination thereof.

The dimensions of the structure 20 are also modifiable prior to production via the 3D printing process to allow for adjustment of variables to accommodate various arrangements, sizes, and locations of the structure 20. For example, the thickness T of the supports 22 may be varied to provide a specified degree of support and energy absorption. It will also be understood that other dimensions, including, but not limited to, the height of the plurality of linear segments 90, the length of the plurality of linear segments 90, the spacing of the supports 22 along the central rib 30, the angles at which the linear segments 90 are oriented, the length of plurality of linear segments 90, the density of the members 24, etc., may be adjusted or varied to provide energy absorption while also providing structure within the housing 16 (FIGS. 2A-3) without departing from the scope of the present disclosure. This provides a level of flexibility and ease for adjusting the energy absorption structure 20 for use in various positions within the vehicle 50. It will be understood that, while this energy absorption structure 20 is described as being used in a vehicle door 10, it is contemplated that the structure 20 may be used in various locations through the vehicle 50 without departing from the scope of the present disclosure.

It will be understood by one having ordinary skill in the art that construction of the described disclosure and other components is not limited to any specific material. Other exemplary examples of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It will be understood by one having ordinary skill in the art that construction of the described disclosure and other components is not limited to any specific material. Other exemplary embodiments of the disclosure disclosed herein may be formed from a wide variety of materials, unless described otherwise herein.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for 6 illustrative purposes and are not to be construed as limiting.

What is claimed is:

1. A vehicle door comprising:
   an interior panel including a housing extending from a first side of the interior panel, the housing defining a cavity;
   an energy absorption structure positioned within the cavity and including a plurality of members arranged in a plurality of rows, each of the plurality of members including:
   a rib; and
   at least one arcuate support coupled with the rib and having first and second ends, wherein the at least one arcuate support of each member is coupled to the at least one arcuate support of a neighboring member at one of the first and second ends.

2. The vehicle door of claim 1, wherein the at least one arcuate support comprises one or more upper supports and one or more lower supports, the upper and lower supports spaced apart by a central space.

3. The vehicle door of claim 1, wherein each of the at least one arcuate support includes a plurality of linear segments extending between the first and second ends.

4. The vehicle door of claim 1, wherein the housing is configured to form an armrest.

5. The vehicle door of claim 1, further comprising:
   an exterior panel coupled with the interior panel and configured to at least partially cover a second side of the interior panel, wherein the energy absorption structure is positioned between the interior panel and the exterior panel.

6. The vehicle door of claim 1, wherein the at least one arcuate support has a semi-circular shape and opens toward the first side of the interior panel.

7. A vehicle door comprising:
   a panel including a first side and a second side;
   a housing extending from the first side and defining a cavity in communication with an opening, wherein the opening is defined by a rim of the second side;
   an energy absorption structure positioned within the cavity and including:
   a first member having a first central rib and a first support having a first end;
   a second member having a second central rib and a second support having a second end, wherein the second end contacts the first end at a joinder; and
   a third member offset from the first and second members, wherein the third member includes a third central rib and the joinder is coupled with an edge of the third central rib.

8. The vehicle door of claim 7, wherein each of member includes one or more upper supports and one or more lower supports, the upper and lower supports spaced apart by a central space.

9. The vehicle door of claim 7, wherein each support includes a plurality of linear segments to form a substantially semi-circular shape centered on the respective central rib.

10. The vehicle door of claim 7, wherein the housing is configured to form an armrest.

11. The vehicle door of claim 7, further comprising:
    a cover coupled with the rim of the second side to enclose the energy absorption structure within the cavity of the housing.

12. An energy absorption structure for a vehicle, comprising:
    a first member including at least one first support extending from a first central rib and having a substantially semi-circular shape;
    a second member including at least one second support extending from a second central rib and having a substantially semi-circular shape, wherein the first and second members are positioned in a first row; and
    a third member including at least one third support extending from a third central rib and having a substantially semi-circular shape, wherein the third member is positioned in a second row offset from the first row, and a first end of the at least one first support and a second end of the at least one second support are coupled with the third central rib.

13. The energy absorption structure of claim 12, wherein the at least one first support includes a first upper support and a first lower support spaced apart by a first central space and the at least one second support includes a second upper support and a second lower support spaced apart by a second central space.

14. The energy absorption structure of claim 13, wherein the first upper support is coupled with the second upper support and the first lower support is coupled with the second lower support.

15. The energy absorption structure of claim 12, wherein the at least one first support includes a pair of first upper supports spaced apart by a first upper space and a pair of first lower supports spaced apart by a first lower space.

16. The energy absorption structure of claim 15, wherein the pair of first upper supports is spaced apart from the pair of first lower supports by a first central space.

17. The energy absorption structure of claim 12, wherein each of the at least one first support, the at least one second support, and the at least one third support includes a plurality of linear segments extending from a central segment.

18. The energy absorption structure of claim 17, wherein the plurality of linear segments of each member is integrally formed with the respective central rib as a single piece.

19. The energy absorption structure of claim 12, wherein the first, second, and third members are integrally formed as a single piece.

20. The energy absorption structure of claim 12, wherein one of the at least one first support, the at least one second support, and the at least one third support includes a foot extending outward from the respective support.

* * * * *